(12) United States Patent
Kim et al.

(10) Patent No.: US 7,862,924 B2
(45) Date of Patent: Jan. 4, 2011

(54) BATTERY MODULE

(75) Inventors: Tae-Yong Kim, Suwon-si (KR);
Yoon-Cheol Jeon, Suwon-si (KR);
Gun-Goo Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 851 days.

(21) Appl. No.: 11/412,577

(22) Filed: Apr. 26, 2006

(65) Prior Publication Data
US 2006/0240318 A1 Oct. 26, 2006

(30) Foreign Application Priority Data
Apr. 26, 2005 (KR) .................. 10-2005-0034386

(51) Int. Cl.
*H01M 10/50* (2006.01)
*H01M 6/42* (2006.01)
(52) U.S. Cl. .................. 429/72; 429/120; 429/159; 429/156
(58) Field of Classification Search .................. 429/120
See application file for complete search history.

(56) References Cited

U.S. PATENT DOCUMENTS

| 6,517,966 | B1 * | 2/2003 | Marukawa et al. | 429/120 |
| 2003/0003351 | A1 * | 1/2003 | Ogata et al. | 429/120 |

FOREIGN PATENT DOCUMENTS

| CN | 1319916 A | 10/2001 |
| JP | 08-321329 | * 12/1996 |
| JP | 2001-023702 | 1/2001 |
| JP | 2001-196103 | 7/2001 |
| JP | 2003-7355 | 1/2003 |
| JP | 2003-187767 | 7/2003 |
| JP | 2003-317812 | 11/2003 |
| JP | 2004-213922 | 7/2004 |
| JP | 2005-005167 | * 1/2005 |
| KR | 1998-045071 | 9/1998 |

OTHER PUBLICATIONS

Patent abstracts of Japan for publication No. 2003-007355 dated Jan. 10, 2003 in the name of DaisukeTakahaski et al.
Patent abstracts of Japan for publication No. 2003-187767 dated Jul. 4, 2003 in the name of Takanori Ito et al.
Patent abstracts of Japan for publication No. 2003-317812 dated Nov. 7, 2003 in the name of Katsuhiko Kato.
Patent abstracts of Japan for publication No. 2004-213922 dated Jul. 29, 2004 in the name of Takashi Asahina, et al.
Korean Utility Model Abstracts for publication No. 20-1998-0045071 dated Sep. 25, 1998 in the name of Do-Yang Jung.
Japanese Office action dated Dec. 8, 2009, for corresponding Japanese application 2006-121194, noting listed references in this IDS, as well as JP 2003-317812 previously filed in an IDS dated Mar. 4, 2008.

* cited by examiner

*Primary Examiner*—Dah-Wei D Yuan
*Assistant Examiner*—Jacob Marks
(74) *Attorney, Agent, or Firm*—Christie, Parker & Hale, LLP (57) ABSTRACT

A battery module includes unit batteries spaced apart from each other and a barrier arranged between neighboring ones of the unit batteries. The barrier includes protrusions formed on a front surface, a rear surface, or both of the barrier to form an airflow portion; and strength reinforcing portions formed on the barrier, each extending in a direction and having a channel.

17 Claims, 8 Drawing Sheets

BATTERY MODULE

CROSS-REFERENCE TO RELATED APPLICATION

This application claims priority to and the benefit of Korean Patent Application No. 10-2005-0034386 filed in the Korean Intellectual Property Office on Apr. 26, 2005, the entire content of which is incorporated herein by reference.

BACKGROUND

Since several to tens of unit batteries are typically connected to each other to form one rechargeable battery module, there is a need to efficiently dissipate heat generated from each unit battery. In particular, when the battery module is applied to a hybrid electric vehicle (HEV), efficient heat dissipation is of significant importance.

If the heat dissipation does not occur properly in the battery module, the temperature of the battery module may excessively increase due to the heat generated from each unit battery, and accordingly, not only the battery module but also the machines with the battery module, can malfunction. In the case of prismatic batteries, this problem will become more severe.

Accordingly, when forming the battery module, barriers are disposed between unit batteries, and the space formed by the barriers between unit batteries is used not only for cooling unit batteries but also for preventing distortion due to heat expansion of the unit batteries.

To perform such functions, the barriers need sufficient strength and structure for efficient heat dissipation.

However, the barriers in the conventional battery module do not satisfy the above two conditions simultaneously so there is difficulty in forming battery modules of the quality which consumers expect.

That is, if the barriers ensure the sufficient strength, its manufacturing cost is increased and there are limitations in designing a passage of cooling air. Alternatively, if the barriers are formed having high cooling efficiency, they tend to exhibit structural weakness.

SUMMARY

A battery module includes unit batteries spaced apart from each other and a barrier arranged between neighboring ones of the unit batteries. The barrier includes protrusions formed on a front surface, a rear surface, or both of the barrier to form an airflow portion; and strength reinforcing portions formed on the barrier, each extending in a direction and having a channel.

In one embodiment, the strength reinforcing portions are formed on opposite side edges of the barrier and the protrusions are formed between the strength reinforcing portions. Each protrusion may be formed in a truncated conical shape. In another embodiment, the protrusions are disposed apart from each other at predetermined intervals and protrude in a substantially identical direction to each other.

An area where the strength reinforcing portions are formed may be about 10-30% of an overall area of the barrier.

In one embodiment, the channel is formed on the front surface and the rear surface of the barrier. In another embodiment, the strength reinforcing portions include ribs arranged on the front surface, the rear surface, or both of the barrier, the ribs extending in the direction, and the channel is formed between the ribs. The ribs may protrude in a same direction as a direction in which the protrusions protrude, and a width of each of the ribs may be substantially identical to a maximum diameter of each of the protrusions.

The barrier may be a first barrier, and the battery module may further include a second barrier substantially identical in structure to the first barrier. The first barrier and the second barrier may face each other such that the protrusions and strength reinforcing portions of the first barrier respectively contact the protrusions and strength reinforcing portions of the second barrier. The first barrier and the second barrier may be fixedly coupled to each other by welding.

In another embodiment, at least one additional barrier has an area where a strength reinforcing portion is formed and the areas where the strength reinforcing portions of the barriers are formed gradually reduce as the respective barriers are disposed closer toward a center of the battery module. In another embodiment, at least one additional barrier has an airflow portion, and the airflow portions of the barriers gradually increase as the respective barriers are disposed closer toward a center of the battery module.

The direction in which the strength reinforcing portions extend may be a substantially longitudinal or lateral direction of the battery module.

The strength reinforcing portions and the airflow portion may span an entire surface of the barrier.

The barrier may contact the neighboring ones of the unit batteries. In one embodiment, the protrusions contact at least one of the neighboring ones of the unit batteries. In another embodiment, the channel contacts at least one of the neighboring ones of the unit batteries.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to those skilled in the art.

Figure 1:
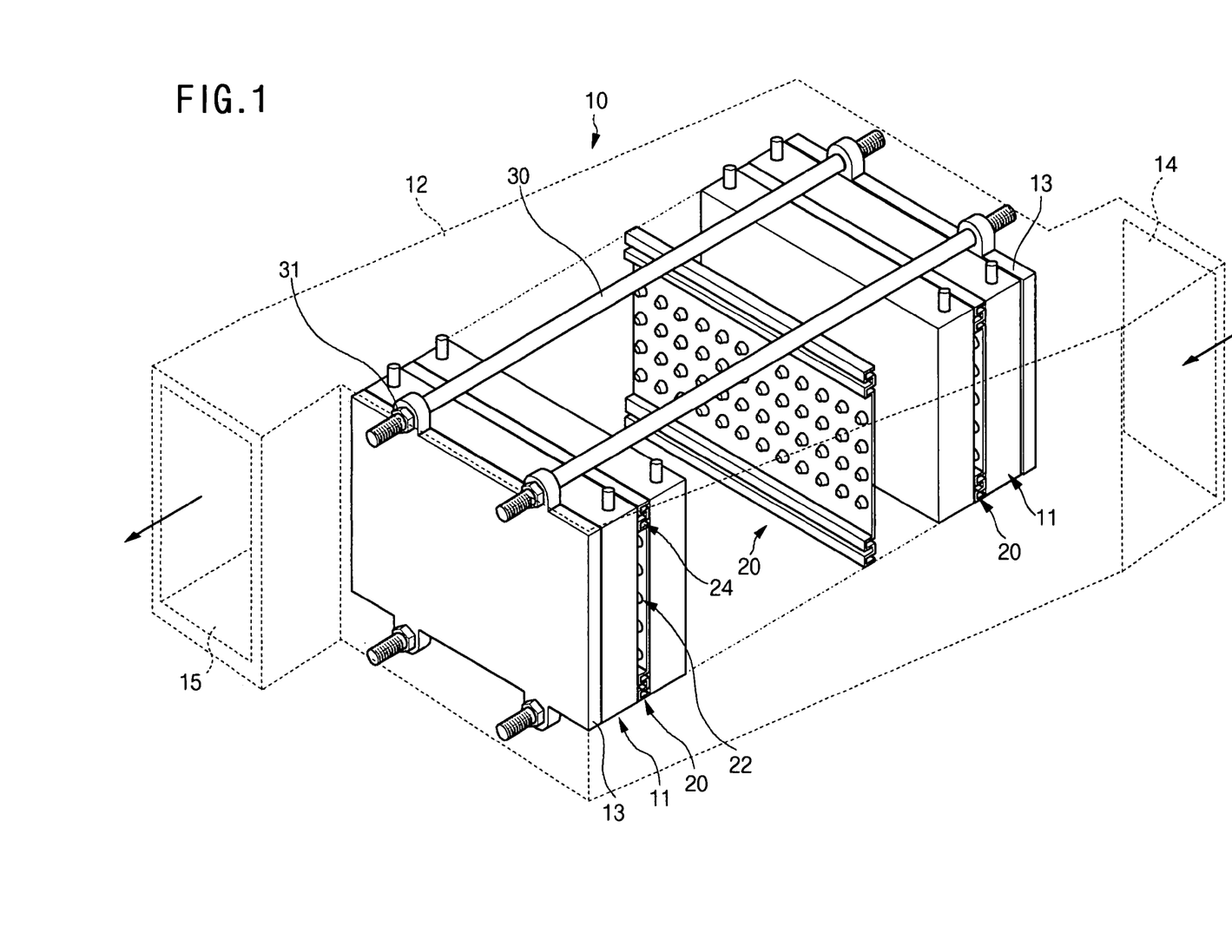
FIG. 1 is a schematic perspective view of a battery module according to an exemplary embodiment of the present invention.

FIG. 1 shows a battery module according to an exemplary embodiment of the present invention.

Referring to FIG. 1, a battery module 10 includes a plurality of unit batteries 11 disposed apart at predetermined intervals.

Each unit battery 11 in this embodiment is a prismatic type rechargeable battery that includes an electrode assembly having a positive electrode, a negative electrode, and a separator interposed between the positive and negative electrodes, and a prismatic case receiving the electrode assembly.

Barriers 20 are disposed between the unit batteries 11 to maintain gaps between the unit batteries 11 and allow a coolant (e.g., air in the present embodiment) to flow between the unit batteries 11.

That is, the unit batteries 11 are spaced apart from each other by the barriers 20 to form a battery aggregate.

The unit batteries 11 and the barriers 20 can closely contact each other by a fastener, that is, by end plates 13 disposed at both of the outermost sides of the battery aggregate and restraint rods 30 combined with the end plates 13 by nuts 31 to thereby form an assembly that will be received in a housing 12.

The housing 12 is provided with an air inlet 14 through which coolant (a temperature control air in this embodiment) is introduced and an air outlet 15 through which the introduced air is exhausted via the unit batteries 11.

That is, the temperature control air is introduced into the housing 12 through the air inlet 14 and passes through the barriers 20 disposed between the unit batteries 11, in the course of which the temperature control air is heat-exchanged with the unit batteries 11. The heat-exchanged air is then exhausted out of the housing 12 through the air outlet 15.

Such a structure of the housing 12 having the air inlet and outlet 14 and 15, and an arrangement of the unit batteries 11 and the barriers 20 are only examples of embodiments of the battery modules that the present invention can adopt, and the present invention is not limited thereto as far as the above-described airflow can be realized.

Figure 2:
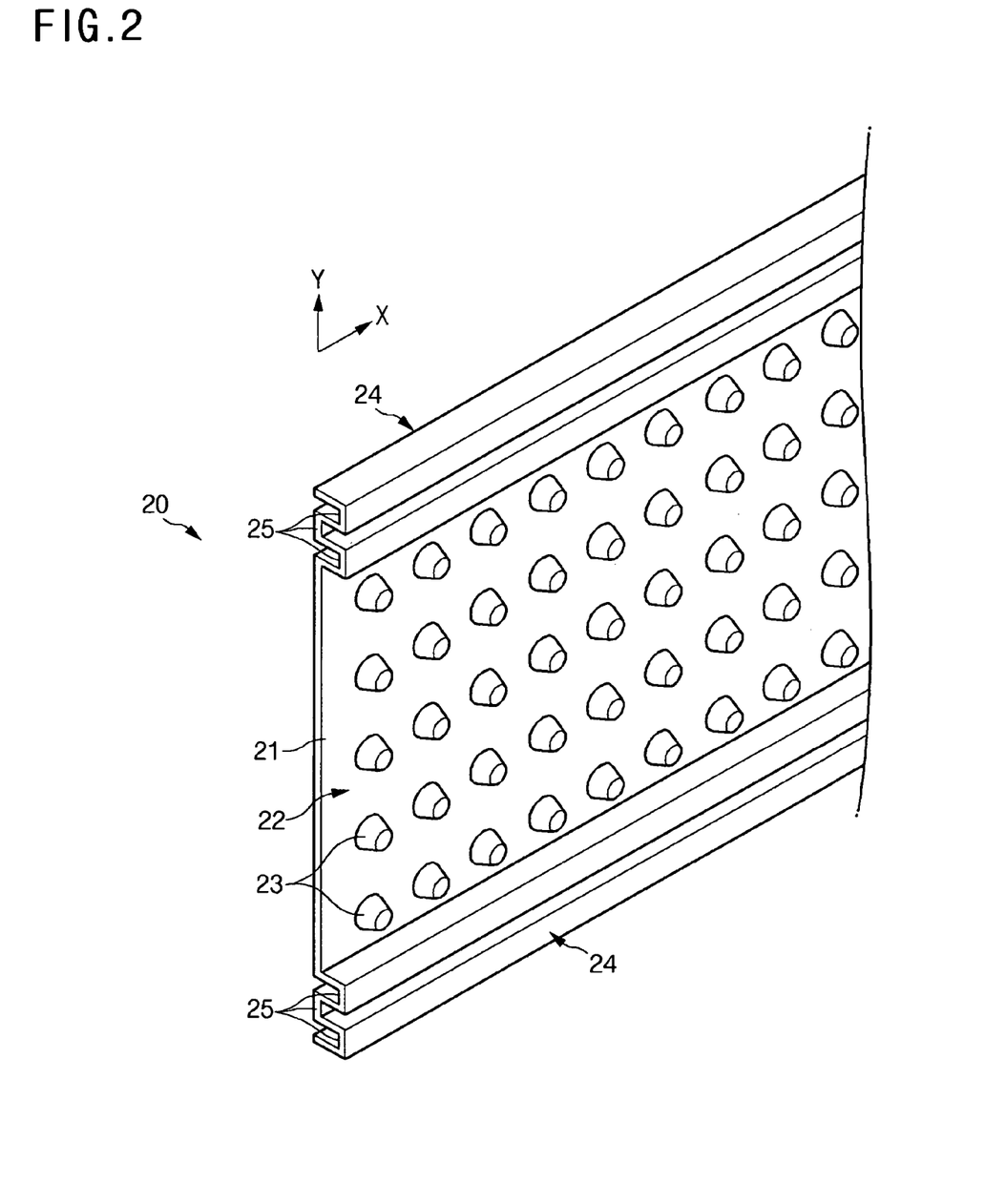
FIG. 2 is a perspective view of a barrier shown in FIG. 1.

Referring to FIG. 2, the barrier 20 is formed of a plate 21 having an identical size to that of a side surface of the unit battery 11. A plurality of protrusions 23 are formed on a first surface of the plate 21 to form an airflow portion 22. The protrusions 23 are spaced apart from each other by a predetermined distance. Strength reinforcing portions 24 having a plurality of channels 25 are formed on both longitudinal side edges of the plate 21.

In this embodiment, the strength reinforcing portions 24 are formed by bending the plate 21 such that strips are formed along a longitudinal axis (X-axis as shown in the drawing) of the barrier 20. The strips define the channels 25 on the first and second surfaces of the barrier 20.

Referring to FIGS. 1 and 2, when the barrier 20 is thus disposed between the unit batteries 11, extreme ends of the protrusions 23, surfaces of the strength reinforcing portion 24, a second surface of the barrier 20, which is opposite to the first surface, contact the surfaces of the adjacent unit batteries 11 to thereby support the adjacent unit batteries 11 and maintain an interval between the adjacent unit batteries. In this state, the air effectively flows through the airflow portion 22 defined between the protrusions 23.

Each protrusion 23 is formed in a truncated conical shape, a diameter of which increases toward the plate 21. Since an interval between the adjacent unit batteries 11 is affected by a height of the protrusion 23, the height of the protrusion 23 is properly set according to a design of the battery module.

As described above, when the barrier 20 is disposed between the adjacent unit batteries 11, the protrusions 23 of the barrier 20 support the unit battery 11 to prevent the unit battery 11 from deforming.

In addition, the strength reinforcing portions 24 also support the adjacent unit batteries 11 and allow the air to effectively flow through the channels 25, thereby efficiently dissipating the heat generated from the unit batteries 11.

With the above-described structure of the barrier 20, not only the strength of the barrier 20 but also the cooling efficiency of the unit battery 11 can be enhanced as compared with a conventional barrier having only protrusions or only ribs.

Figure 3:
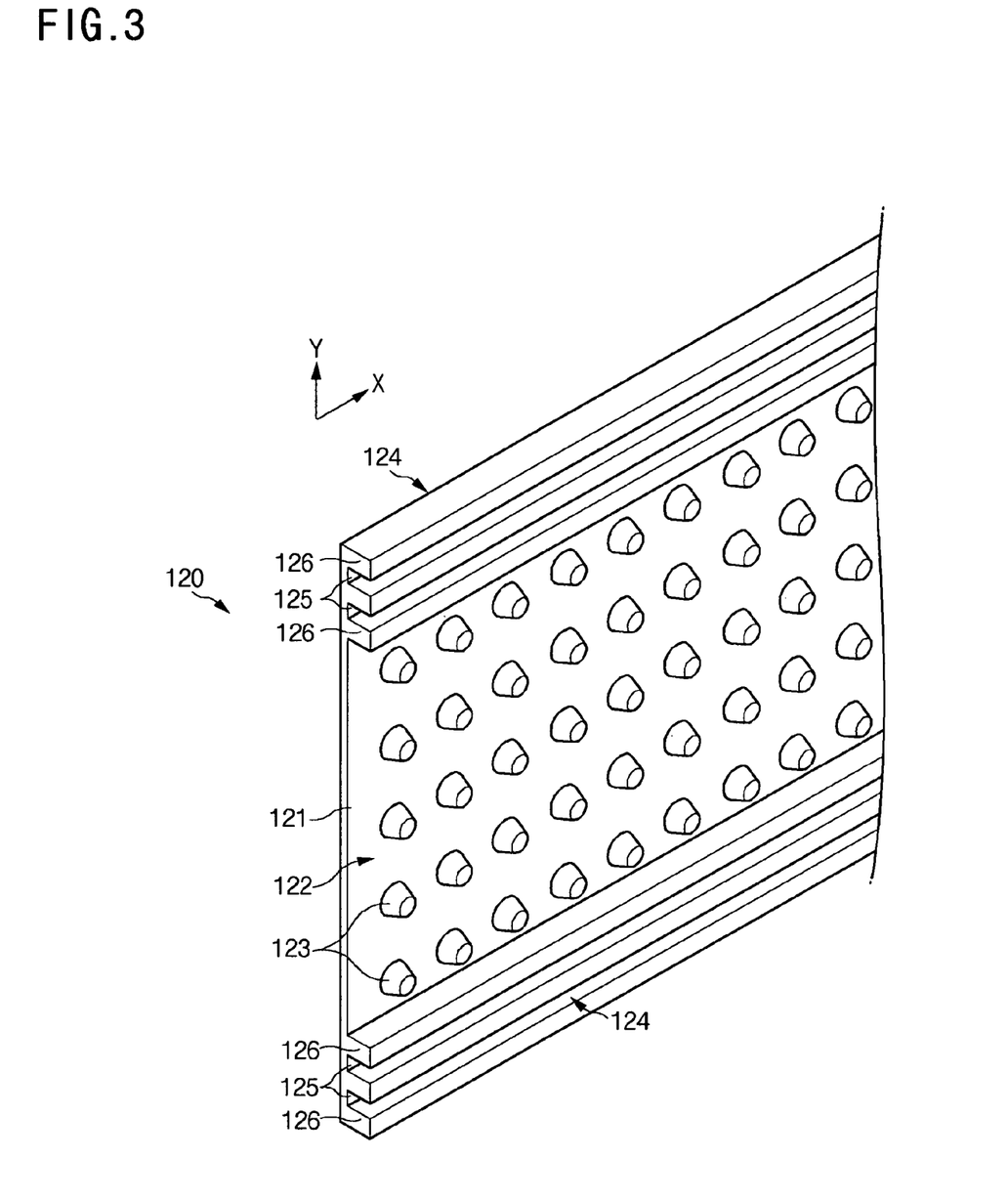
FIG. 3 is a perspective view of a barrier according to another exemplary embodiment of the present invention.

FIG. 3 is a perspective view of a barrier according to another exemplary embodiment of the present invention.

Referring to FIG. 3, a barrier 120 is formed of a plate 121 having an identical size to a side surface of the unit battery. A plurality of protrusions 123 are formed on a first surface of the plate 121. The protrusions 123 are spaced apart from each other by a predetermined distance to form an airflow portion therebetween.

Strength reinforcing portions 124 each having ribs 126 are formed on longitudinal side edges of the first surface of the plate 121 and extend along a longitudinal axis (X-axis in the drawing). Channels 125 are formed between the ribs 126.

The rib 126 is not limited to a specific structure. For example, a width of the rib may be identical to a maximum diameter of the protrusion 123. However, the widths of the ribs may be different from each other.

In addition, distances between the ribs 126 may be identical to or different from each other.

When the barrier 120 is disposed between the adjacent unit batteries, top surfaces of the ribs 126 and projections 123 contact a facing surface of the unit battery to support the unit battery. In this state, the air can effectively flow through the channels 125 and the airflow portion 122 to thereby efficiently dissipate the heat generated from the unit batteries.

At this point, considering that an amount of heat generated at a center portion of the unit battery is greater than that of heat generated at a periphery portion of the unit battery when the unit battery is charged and discharged, the barrier 120 is designed such that an amount of air flowing through the airflow portion 122 is greater than that of air flowing through the channels 125.

However, since the strength reinforcing portion 124 formed on the longitudinal side edges of the barrier 120 is greater in a bending stress than the airflow portion 122 formed by the protrusions 123, the deformation of the barrier 120, which is caused by a stress concentration generated locally on the end plates by a restraint force of the nut fixing the restraint rod to the end plates, can be prevented.

In this embodiment, an area where the protrusions 123 are formed is about 70-90% of an overall area of the first surface of the barrier 120 while an area of the longitudinal side edges where the strength reinforcing portions 124 are formed is about 10-30% of the overall area of the first surface of the barrier 120.

When the area where the protrusions 123 are formed is more than 90% of the overall area of the first surface, the overall strength of the barrier 120 may be deteriorated. When the area of the longitudinal side edges is more than 30% of the overall area of the first surface of the barrier 120, the overall cooling efficiency of the barrier 120 may be deteriorated.

With the above-described structure of the barrier 120, not only the strength of the barrier 120 but also the cooling efficiency of the unit battery can be enhanced as compared with a conventional barrier having only protrusions or only ribs.

Figure 4:
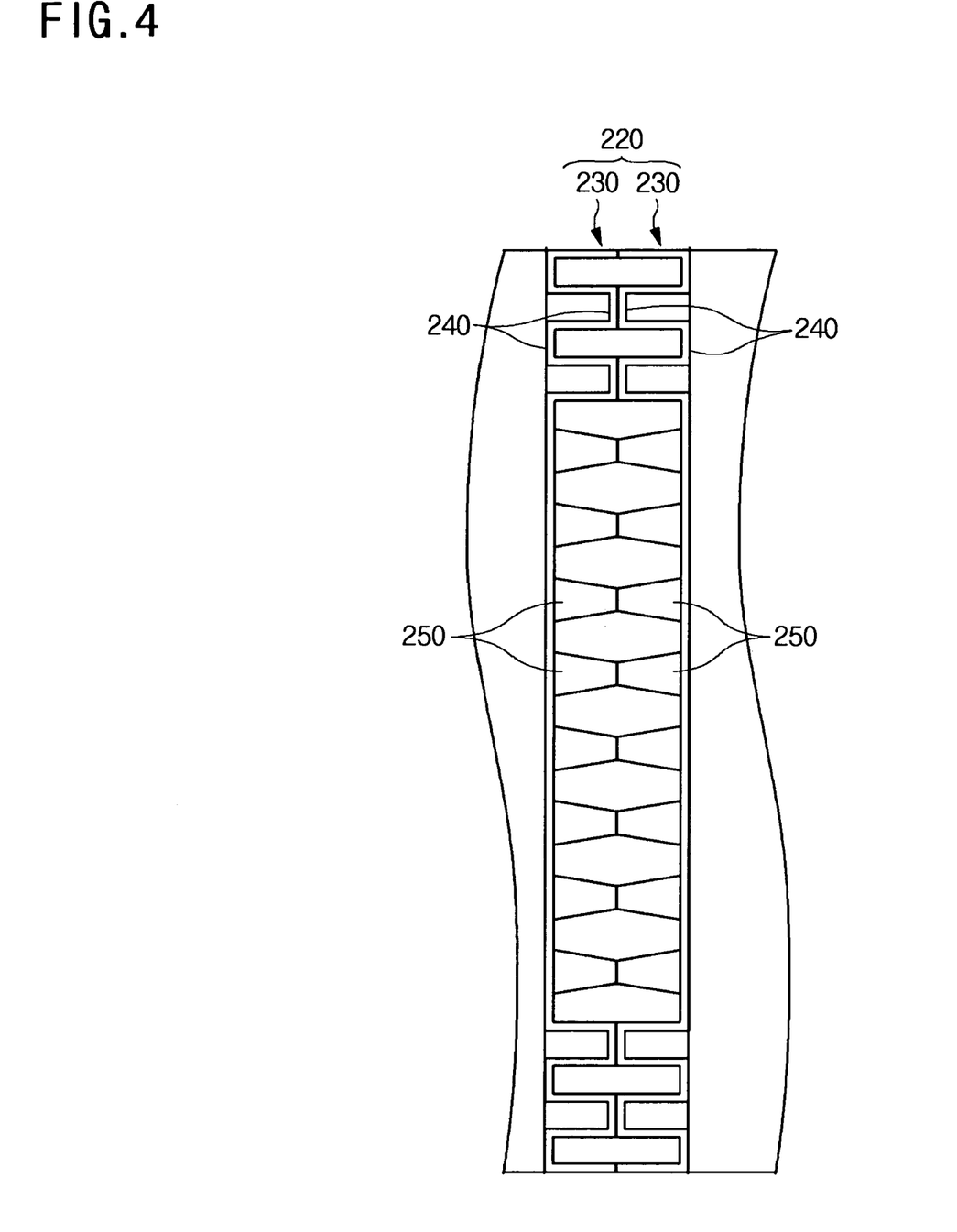
FIG. 4 is a side view of a barrier according to another exemplary embodiment of the present invention.
Figure 5:
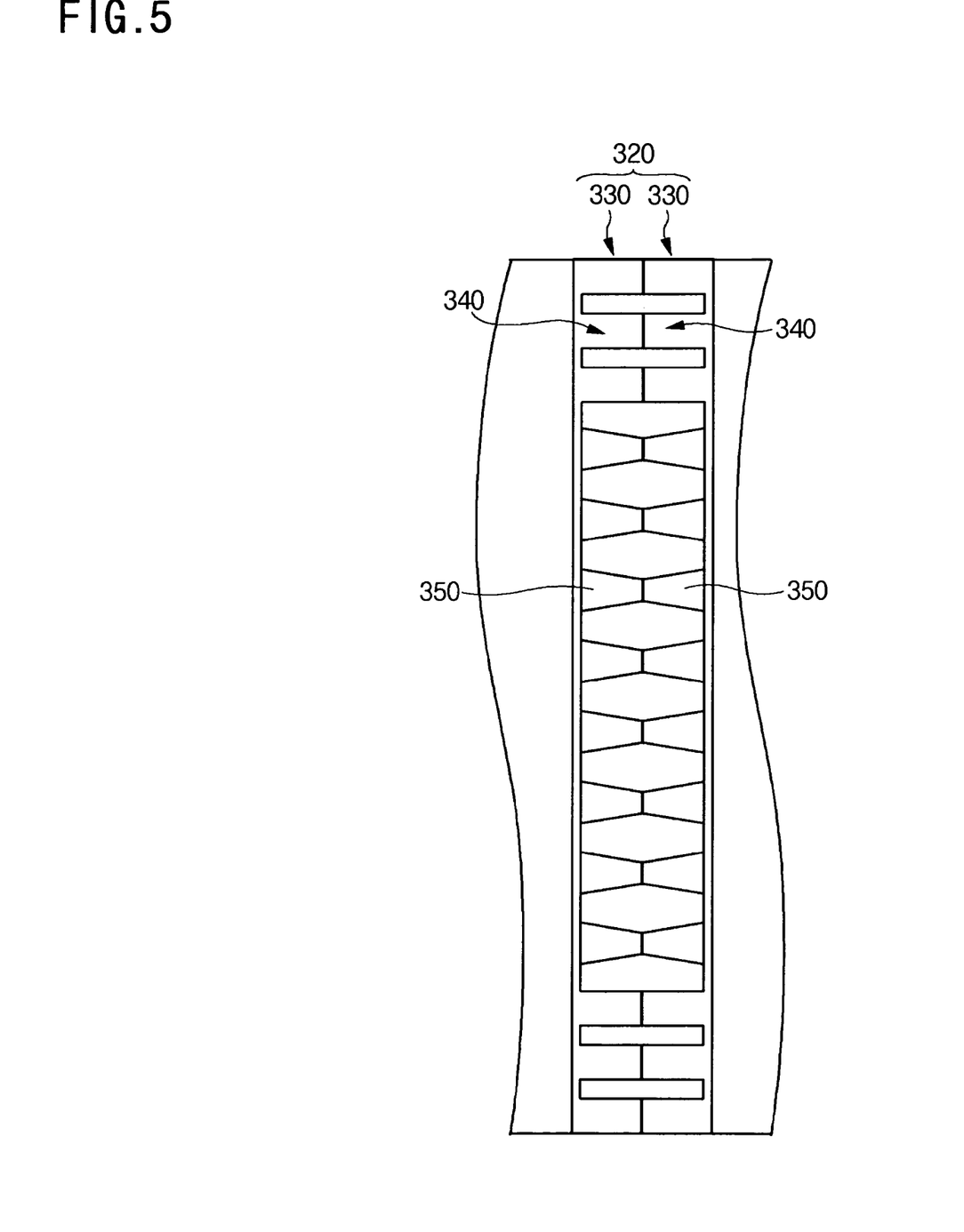
FIG. 5 is a side view of a barrier according to another exemplary embodiment of the present invention.

FIGS. 4 and 5 show barriers according to other exemplary embodiments of the present invention.

In these embodiments, two sub-barriers each having the airflow portion and the strength reinforcing portions that are described in the foregoing embodiments of FIGS. 2 and 3 are disposed symmetrically and contact each other to form a barrier.

In these embodiments, the facing sub-barriers are identical in the structure of the airflow portion and the strength reinforcing portions to each other.

That is, FIG. 4 shows an exemplary embodiment where a barrier 220 includes two sub-barriers 230, each identical to that of FIG. 2. The sub-barriers 230 face symmetrically such that strength reinforcing portions 240 and protrusions 250 of one of the sub-barriers 230 respectively contact strength reinforcing portions 240 and protrusions 250 of the other of the sub-barriers 230.

FIG. 5 shows an exemplary embodiment where a barrier 320 includes two sub-barriers 330, each identical to that of FIG. 3. The sub-barriers 330 face symmetrically such that strength reinforcing portions 340 and protrusions 350 of one of the sub-barriers 330 respectively contact strength reinforcing portions 340 and protrusions 350 of the other of the sub-barriers 330.

The sub-barriers 230 (330) are fixedly coupled to each other by laser-welding.

According to the embodiments of FIGS. 4 and 5, the airflow passages are enlarged to more effectively dissipate the heat generated from the unit batteries.

Figure 6:
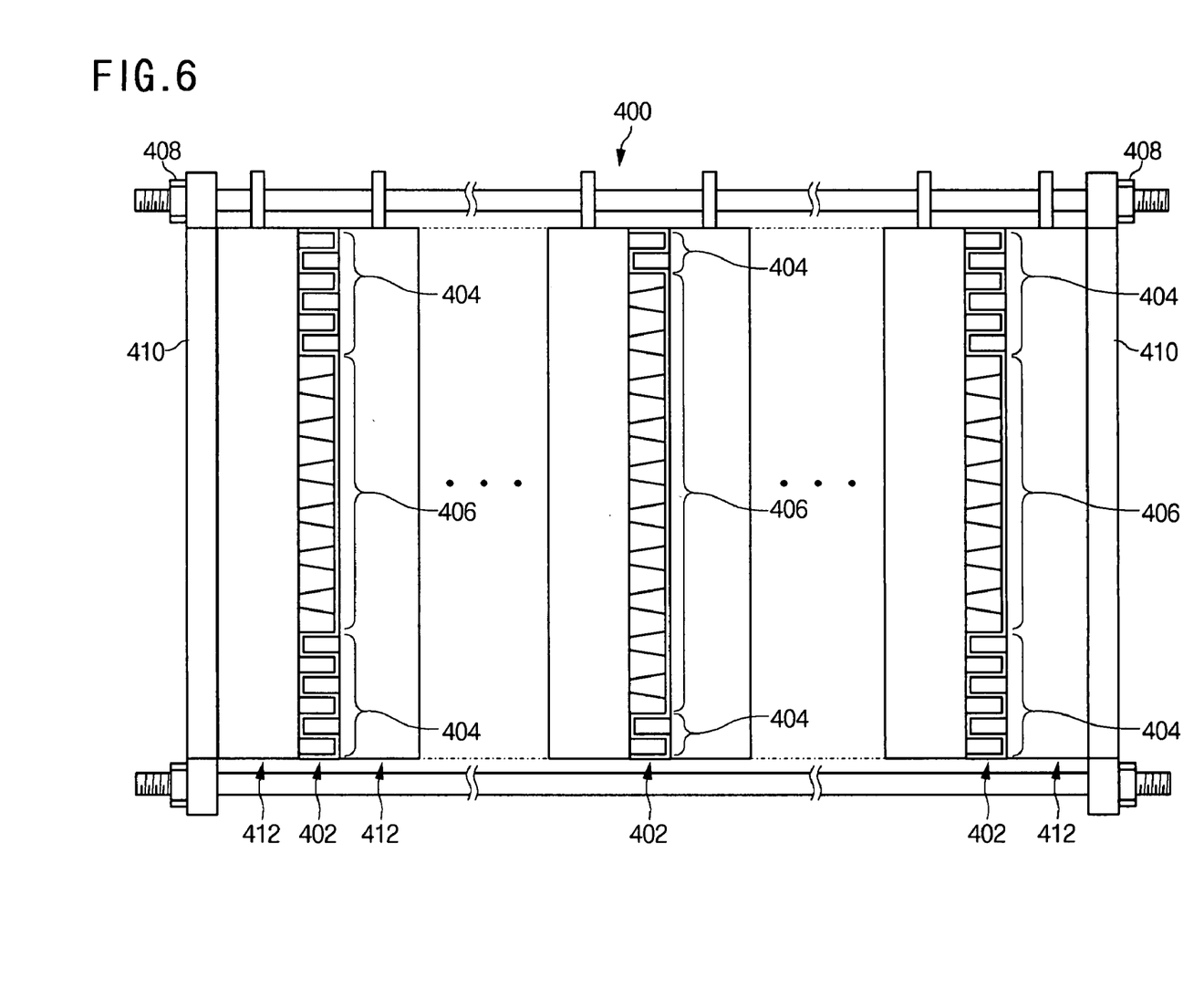
FIG. 6 is a schematic side view of a battery module according to another exemplary embodiment of the present invention.

FIG. 6 shows a battery module according to another embodiment of the present invention.

Referring to FIG. 6, a battery module 400 of this embodiment is basically identical to that of FIG. 1. However, in this embodiment, areas of longitudinal side edges where strength reinforcing portions 404 of barriers 402 are formed are gradually reduced from both sides of the battery module 400 toward a center of the battery module 400 while areas where protrusions 406 forming airflow portions of the barriers 402 are gradually increased toward the center of the battery module 400.

That is, since a stress applied to end plates 410 by nuts 408 is gradually reduced toward the center of the battery module 400, the areas of the longitudinal side edges where the strength reinforcing portions 404 are formed are gradually increased toward the both sides of the battery module 400 to prevent the barriers 402 from deforming.

Furthermore, since an amount of heat generated by unit batteries 412 is gradually increased toward the center of the battery module 400, the areas where the protrusions 406 forming the airflow portion are gradually increased toward the center of the battery module 400. Therefore, the unit batteries 412 of the battery module 400 can be uniformly cooled.

Figure 7:
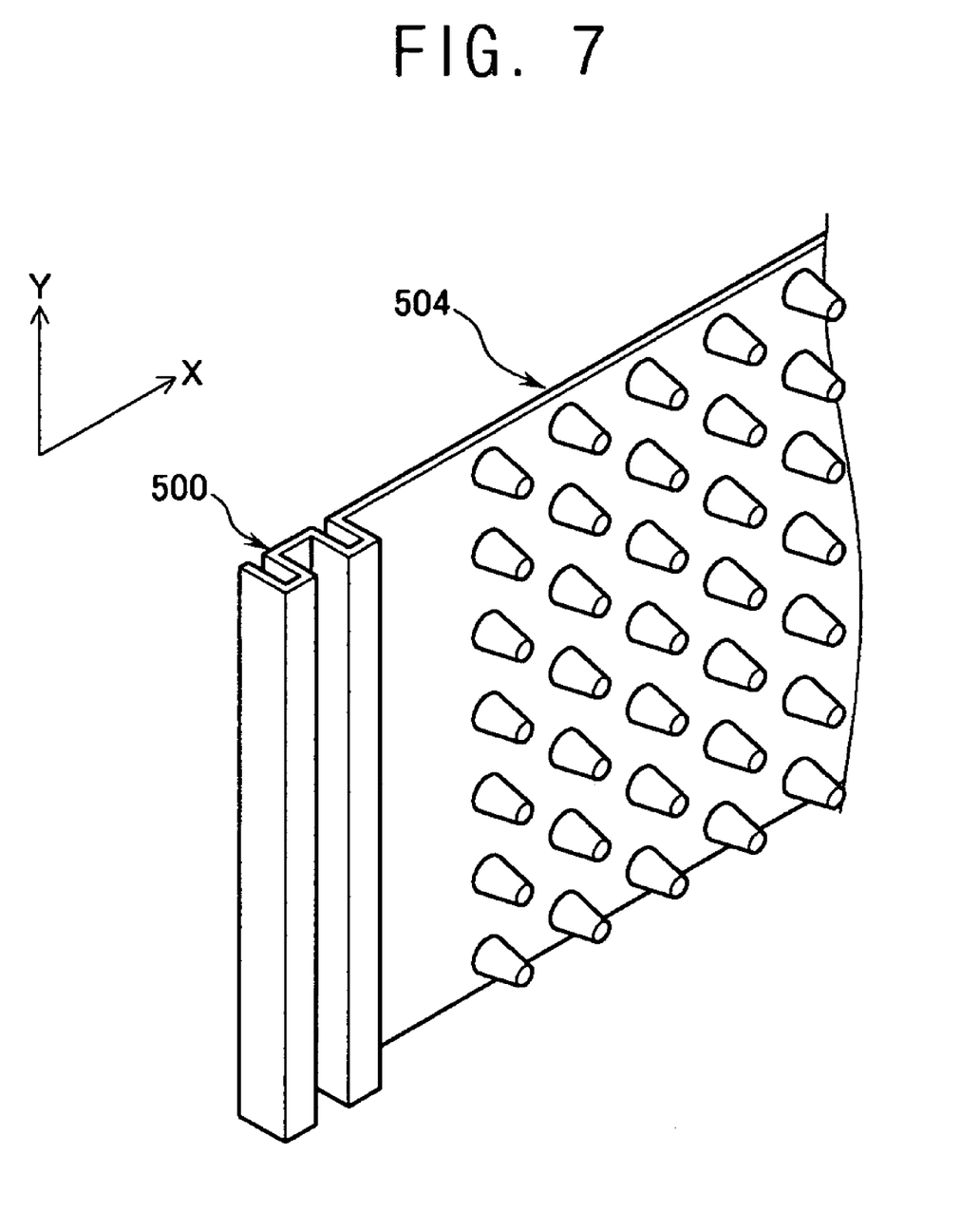
FIG. 7 is a perspective view of a barrier according to another exemplary embodiment of the present invention.
Figure 8:
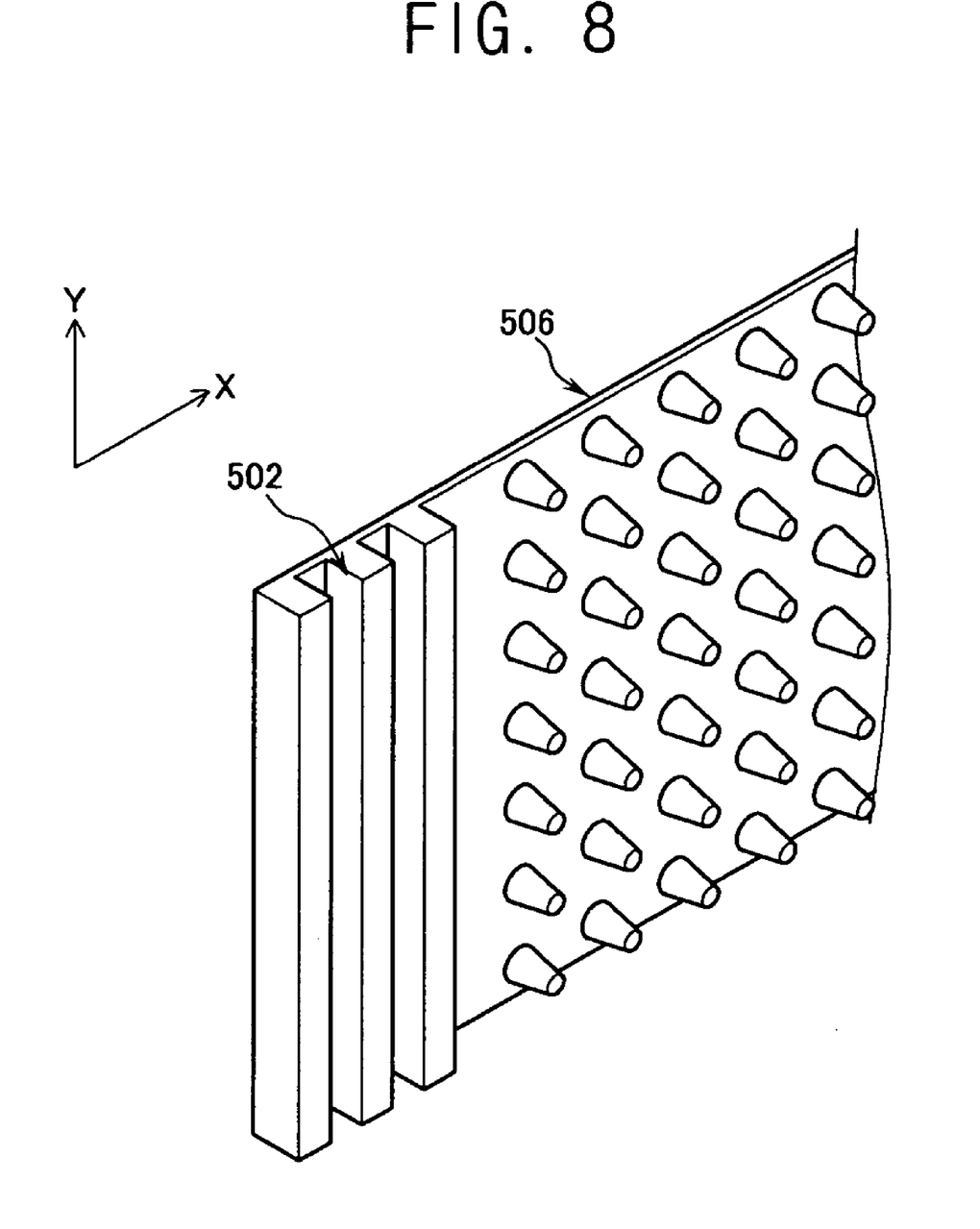
FIG. 8 is a perspective view of a barrier according to another exemplary embodiment of the present invention.

As shown in FIGS. 7 and 8, strength reinforcing portions 500 and 502 may not be formed on the longitudinal side edges but on lateral side edges of barriers 504 and 506 along a lateral direction (Y-axis in the drawings).

According to the embodiments of the present invention described above, by improving the structure of the barriers, the strength of the barriers can be enhanced to prevent the unit battery from deforming and the heat dissipation efficiency of the battery module can be improved.

The battery module according to these embodiments of the present invention may be used as the power source for motor driving devices, such as the hybrid electric vehicles, electric vehicles, wireless vacuum cleaners, motorbikes, or motor scooters.

Although exemplary embodiments of the present invention have been shown and described, it will be appreciated by those skilled in the art that changes may be made to these embodiments without departing from the principles and spirit of the invention, the scope of which is defined in the claims and their equivalents.

What is claimed is:

1. A battery module comprising:
   unit batteries spaced apart from each other; and
   a barrier between and contacting adjacent ones of the unit batteries,
   wherein the barrier comprises:
      a barrier plate;
      protrusions on at least one of a front surface or a rear surface of the barrier plate, and an airflow portion defined between the protrusions, the protrusions contacting at least one of the adjacent ones of the unit batteries; and
      strength reinforcing portions on the barrier plate, each extending in a direction and having a channel, the strength reinforcing portions contacting opposite periphery portions of the at least one of the adjacent ones of the unit batteries,
   wherein the protrusions contact the at least one of the adjacent ones of the unit batteries between the opposite periphery portions, and wherein the protrusions are spaced apart from adjacent ones of the protrusions in the direction in which the strength reinforcing portions extend.

2. The battery module of claim 1, wherein the strength reinforcing portions are on opposite side edges of the barrier plate, and the protrusions are between the strength reinforcing portions.

3. The battery module of claim 1, wherein the protrusions are spaced apart from each other at intervals.

4. The battery module of claim 1, wherein an area where the strength reinforcing portions are located is about 10-30% of an overall area of the barrier.

5. The battery module of claim 1, wherein the protrusions protrude in a substantially identical direction to each other.

6. The battery module of claim 1, wherein each of the protrusions has a truncated conical shape.

7. The battery module of claim 1, wherein the channel is on the front surface and the rear surface of the barrier plate.

8. The battery module of claim 1, wherein the strength reinforcing portions include ribs on at least one of the front surface or the rear surface of the barrier plate, the ribs extending in the direction, and wherein the channel is between the ribs.

9. The battery module of claim 8, wherein the ribs protrude in a same direction as a direction in which the protrusions protrude.

10. The battery module of claim 9, wherein a width of each of the ribs is substantially identical to a maximum diameter of each of the protrusions.

11. A battery module comprising unit batteries spaced apart from each other, and a barrier between and contacting adjacent ones of the unit batteries, the barrier comprising:
   a first barrier comprising:
      a first barrier plate;
      protrusions on at least one of a front surface or a rear surface of the first barrier plate, and a first airflow portion defined between the protrusions; and
      strength reinforcing portions on the first barrier plate, each extending in a direction and having a channel; and
   a second barrier comprising:
      a second barrier plate;

protrusions on at least one of a front surface or a rear surface of the second barrier plate, and a second airflow portion defined between the protrusions of the second barrier; and strength reinforcing portions on the second barrier plate, each extending in a direction and having a channel, wherein the first barrier and the second barrier face each other such that the protrusions and strength reinforcing portions of the first barrier respectively contact the protrusions and strength reinforcing portions of the second barrier.

12. The battery module of claim 11, wherein the first barrier and the second barrier are fixedly coupled to each other by welding.

13. A battery module comprising:

unit batteries spaced apart from each other; and a barrier between and contacting adjacent ones of the unit batteries, wherein the barrier comprises:

a barrier plate;

protrusions on at least one of a front surface or a rear surface of the barrier plate, and an airflow portion defined between the protrusions, the protrusions contacting at least one of the adjacent ones of the unit batteries; and strength reinforcing portions on the barrier plate, each extending in a direction and having a channel, the strength reinforcing portions contacting at least one of the adjacent ones of the unit batteries, wherein the battery module further comprises at least one additional barrier having strength reinforcing portions, wherein areas where the strength reinforcing portions of the barriers are located gradually decrease as the respective barriers are located closer toward a center of the battery module.

14. A battery module comprising:

unit batteries spaced apart from each other; and a barrier between and contacting adjacent ones of the unit batteries, wherein the barrier comprises:

a barrier plate;

protrusions on at least one of a front surface or a rear surface of the barrier plate, and an airflow portion defined between the protrusions, the protrusions contacting at least one of the adjacent ones of the unit batteries; and strength reinforcing portions on the barrier plate, each extending in a direction and having a channel, the strength reinforcing portions contacting at least one of the adjacent ones of the unit batteries, wherein the battery module further comprises at least one additional barrier having an airflow portion, wherein the airflow portions of the barriers gradually increase in size as the respective barriers are located closer toward a center of the battery module.

15. The battery module of claim 1, wherein the direction in which the strength reinforcing portions extend is a substantially longitudinal direction of the barrier.

16. The battery module of claim 1, wherein the direction in which the strength reinforcing portions extend is a substantially lateral direction of the barrier.

17. The battery module of claim 1, wherein the strength reinforcing portions and the airflow portion span an entire surface of the barrier plate.

* * * * *